United States Patent Office 3,367,937
Patented Feb. 6, 1968

3,367,937
BENZOTHIOXANTHENE DICARBOXYLIC ACID IMIDE DYESTUFFS
Otto Fuchs and Helmut Tröster, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 27, 1965, Ser. No. 475,279
Claims priority, application Germany, Aug. 7, 1964, F 43,691
7 Claims. (Cl. 260—281)

The present invention relates to novel water-insoluble dyestuffs and a process for their manufacture, in particular, to the dyestuffs of the general formula

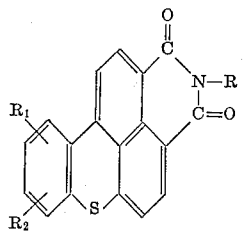

in which R represents a hydrogen atom, an alkyl, cycloalkyl or aryl group which is substituted, if desired, a heterocyclic ring or a hydroxy or amino group, and $R_1$ and $R_2$ represent hydrogen or halogen atoms, alkyl, aryl, alkoxy, cyano, hydroxy, carbalkoxy, acyloxy or amino groups.

It has now been found that dyestuffs of the general formula

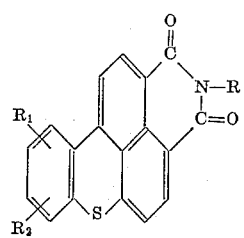

in which R represents a hydrogen atom, an alkyl, cycloalkyl or aryl group which is substituted, if desired, a heterocyclic ring or a hydroxy or amino group, and $R_1$ and $R_2$ represent hydrogen or halogen atoms, alkyl, aryl, alkoxy, cyano, hydroxy, carbalkoxy, acyloxy or amino groups, are obtained by heating
(a) the diazonium salts of 4-(2'-aminophenylmercapto)-naphthalic acid imides of the general formula

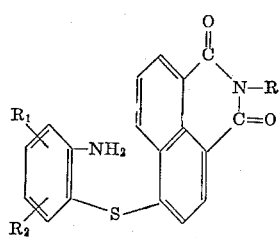

or
(b) the diazonium salts of 4-phenylmercapto-5-aminonaphthalic acid imides of the general formula

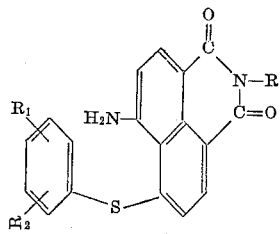

in which R, $R_1$ and $R_2$ have the meanings given above, in the presence of copper or copper salts or by heating
(c) the diazonium salts of 4-(2'-aminophenylmercapto)-naphthalic acids or 4-(2-aminophenylmercapto)-naphthalic acid-anhydrides, or
(d) the diazonium salts of 4-phenylmercapto-5-amino-naphthalic acids or 4-phenylmercapto-5-aminonaphthalic acid-anhydrides in the presence of copper or copper salts and by condensing the benzothioxanthene derivatives of the general formula thus obtained

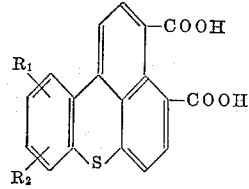

or

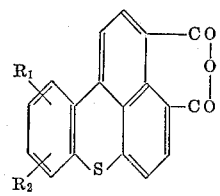

with compounds of the general formula

R—NH₂

R, $R_1$ and $R_2$ indicated in the formulae having the meanings mentioned above.

The cyclization, effected according to the embodiments (a) to (d) can be carried out in various ways. The diazo solution or the diazo suspension acidified by acetic acid or a mineral acid can either be allowed to flow into a boiling aqueous neutral, acid or also basic solution of copper salt or it can be mixed with a copper salt solution and heated subsequently, or copper powder is stirred into the diazo solution and the whole is subsequently heated until the evolution of nitrogen ceases. The cyclization is suitably carried out at temperatures ranging from about 70° to 110° C.

The dyestuffs of the invention obtainable according to the embodiments (a) and (b) can be isolated in known manner. The benzothioxanthene derivatives at first obtained according to the embodiments (c) and (d) are converted into the dyestuffs after being isolated in usual manner by condensation with compounds of the formula R—NH₂ indicated above. For this purpose, it is advisable to operate in such a manner as to heat the substituted or unsubstituted benzothioxanthene dicarboxylic acids or their anhydrides with an excess amount of ammonia or amine in water or in an inert organic solvent such as, for example, methanol, ethanol, isopropanol or an ethylene glycolmonoalkyl ether, for a prolonged period of time, if desired, under pressure. The condensation is preferably carried out at temperatures ranging from about 70° to 160° C. The dyestuffs formed separate from the reaction mixture and can be isolated in usual manner.

In addition to ammonia, hydroxylamine and hydrazines used as amines for the condensation with the benzothioxanthene dicarboxylic acids or their anhydrides, there are mentioned aliphatic, cycloaliphatic, aromatic, araliphatic and heterocyclic amines such as, for example, methylamine, ethylamine, butylamine, isopropylamine, ethanol amine or propanol amine, methoxyethyl amines, methoxypropyl amines or methoxybutyl amines, butoxypropyl amines, isopropoxypropylamines, methoxyethoxypropyl amines, β-ethoxy-β'-(Ω-aminopropoxy) - diethyl ether, acetoxyethyl amines, cyclohexyl amine, cyclohexoxy-propyl amines, anilines, anisidines, xylidines, cyclohexyl anilines, phenylethyl amine, 5-aminobenzoxazol and 2-amino-3-methoxy-diphenylene oxide.

The 4-(2'-aminophenyl-mercapto)-naphthalic acid imides used according to embodiment (a) can be prepared in known manner by condensing 4-bromo- or 4-chloronaphthalic acid imides with unsubstituted or substituted o-amino or o-nitrothiophenols in organic solvents such as ethanol, butanol, glycolmonoalkyl ethers, dimethylformamide or pyridine, if desired, in the presence of substances having basic reaction—the nitro group of the o-nitrothio ethers formed in the one case, being subsequently reduced to the amino group—or by reacting 4-mercaptonaphthalic acid imides with unsubstituted or substituted o-nitrochlorobenzenes in the same manner and by converting the o-nitrothioethers obtained into the amino compounds.

The 4-phenylmercapto-5-amino-naphthalic acid imides necessary as starting compounds for the embodiment (b), are obtained in corresponding manner by reacting 4-bromo-5-amino-naphthalic acid imides or 4-chloro-5-amino-naphthalic acid imides with unsubstituted or substituted thiophenols.

The compounds used for the embodiments (c) and (d) can be prepared in analogous manner by replacing the naphthalic acid imides by the corresponding naphthalic acids or their anhydrides.

The compounds obtainable according to the invention are novel valuable yellow dyestuffs of high tinctorial strength, which are extraordinarily suitable for dyeing synthetic materials such as polyethylene glycol terephthalate. They yield brilliant dyeings which are distinguished by very good fastness properties, in particular, by very good fastness to light, wetting and thermofixation.

The following examples serve to illustrate the invention but they are not intended to limit it thereto; the parts being by weight unless otherwise stated:

Example 1

13.3 parts of 4-(2'-aminophenyl-mercapto)-naphthalic acid N-methyl-imide were dissolved in 130 parts of concentrated sulfuric acid at room temperature and were diazotized with the calculated amount of nitrosyl sulfuric acid at 0°–5° C. The diazo solution was poured on to 200 parts of ice and the suspension obtained was subsequently added dropwise to a boiling solution of 50 parts of copper sulfate in 500 parts of water within 90 minutes. After heating to the boil for 1 hour, the orange-coloured dyestuff precipitated was filtered off with suction in cold condition, washed with water and methanol and dried. The compound crystallized from dimethylformamide in the form of orange-coloured needles which melted at 300°–303° C.

*Analysis.*—Calculated: C, 72.0; H, 3.5; N, 4.4; S, 10.1. Found: C, 72.1, 72.3; H, 3.7, 3.9; N, 4.5, 4.6; S, 9.9, 9.6.

The dyestuff obtained in an excellent yield, provided brilliant greenish yellow dyeings on polyester materials of very good fastness to light, wetting and thermofixation.

Example 2

10.0 parts of concentrated hydrochloric acid were allowed to flow into a mixture of 15.7 parts of 4-(2'-aminophenyl - mercapto)-naphthalic acid N-γ-methoxypropyl imide and 170 parts of glacial acetic acid while stirring. The hydrochloride formed was then diazotized with a solution of 3.0 parts of sodium nitrite in 30 parts of water at 0°–5° C. The diazo solution was subsequently allowed to flow into a boiling solution of 35 parts of copper sulfate in 500 parts of water within 1 hour and the whole was subsequently maintained at the boil for another hour. The orange-coloured dyestuff obtained was filtered with suction in cold condition, washed with water and methanol and dried. The yield was almost quantitative.

The dyestuff possessed a very high affinity to polyester fibers and dyed said fibers bright yellow tints having very good fastness properties.

Example 3

16.4 parts of 4-(2'-aminophenyl-mercapto)-naphthalic acid N-p-toluidide were diazotized in a mixture of 180 parts of glacial acetic acid and 10 parts of concentrated hydrochloric acid, in the manner described in Example 2, and the diazo solution obtained was subsequently treated with copper sulfate at the boiling temperature. After the usual working up, there was obtained a dyestuff which yielded greenish yellow dyeings on polyester.

Example 4

18.4 parts of 4-(2'-aminophenyl-mercapto)-naphthalic acid N-γ-cyclohexyloxypropyl imide suspended in 180 parts of glacial acetic acid and 40 parts of water, were diazotized by adding 12.5 parts of concentrated hydrochloric acid and a solution of 3.6 parts of sodium nitrite in 40 parts of water at 0°–5° C. The diazo suspension was then stirred into a boiling solution of 40 parts of copper sulfate, 600 parts of water and 100 parts of glacial acetic acid within 1 hour, the whole was maintained at the boil for another 2 hours and subsequently worked up in usual manner. There was obtained an orange-coloured crystal powder which dyed bright greenish yellow tints on polyester materials, of excellent fastness to light, wetting and thermofixation.

Example 5

17.5 parts of 4-(2'-aminophenyl-mercapto)-naphthalic acid N-Ω-methoxy-γ-ethoxypropylimide were converted into the hydrochloride and were diazotized in the manner described in Example 4. After having treated the diazo solution with boiling acetic acid solution of copper sulfate in usual manner, there was obtained an orange-coloured dyestuff powder which yielded brilliant greenish yellow dyeings on polyester fibers, of excellent fastness to light and thermofixation.

Example 6

9.4 parts of concentrated hydrochloric acid were added to a mixture of 12.0 parts of 4-(2'-amino-4'-chlorophenyl-mercapto)-naphthalic acid N-β-hydroxyethylimide, 135 parts of glacial acetic acid and 30 parts of water and the hydrochloride formed was then diazotized with a solution of 2.3 parts of sodium nitrite in 30 parts of water at 0°–5° C. The diazo solution obtained was subsequently added dropwise to a boiling solution of 30 parts of copper sulfate in 450 parts of water and 75 parts of glacial acetic acid. The orange-coloured dyestuff separating was isolated in usual manner. The dyestuff dyed polyester fibers bright orange-coloured tints which possessed very good fastness to light and thermofixation.

Example 7

6.7 parts of 4-phenylmercapto-5-amino-naphthalic acid N-methylimide were suspended in 50 parts of glacial acetic acid and 10 parts of water and converted into the hydrochloride by adding 5 parts of concentrated hydrochloric acid. After diazotization with a solution of 1.5 parts of sodium nitrite in 15 parts of water the dark red diazo solution was stirred into a boiling solution of 14 parts of copper sulfate in 200 parts of water and 20 parts of glacial acetic acid. The dyestuff obtained after working up in usual manner, was identical with the product described in Example 1.

Example 8

A suspension of 160.5 parts of 4-(2'-aminophenylmercapto)-naphthalic acid anhydride in 1200 parts of glacial acetic acid, 200 parts of water and 125 parts of concentrated hydrochloric acid was heated for a short period of time to a temperature ranging from 70°–80° C. During this period, the hydrochloride formed which was subsequently diazotized with a solution of 36 parts of sodium nitrite in 350 parts of water at 0°–5° C. Stirring was continued for another 2 hours at room temperature and the diazo solution was subsequently added dropwise to a boiling solution of 350 parts of copper sulfate in 5000 parts of water and 500 parts of glacial acetic acid within 90 minutes, while the reaction product precipitated. It was filtered with suction in cold condition, washed with water and methanol and dried. The anhydride of the benzothioxanthene-3.4-dicarboxylic acid obtained in an excellent yield, crystallized from dimethylformamide or from o-dichlorobenzene in the form of orange-coloured needles which melted at 330°–331° C.

*Analysis.*—Calculated: C, 71.1; H, 2.6; S, 10.5. Found: C, 71.4, 71.7; H, 3.0, 3.1; S, 10.5, 10.8.

Example 9

30.0 parts of the acid anhydride prepared in the manner described in Example 8, were heated to the boil in 500 parts of 20% aqueous methylamine solution within 3 hours and the whole was stirred for 6 hours at this temperature. The reaction product was filtered with suction in cold condition, washed with water to obtain a neutral substance, and dried. The dyestuff obtained was identical with the product described in Example 1.

Example 10

A mixture of 15.2 parts of the benzothioxanthene-dicarboxylic acid anhydride obtained according to Example 8, 10 parts of 3-methoxypropylamine and 600 cc. of ethanol was stirred for 8 hours at boiling temperature. The dyestuff which was isolated in the usual manner after cooling, was identical with the product described in Example 2.

Example 11

15.2 parts of the benzothioxanthene-dicarboxylic acid anhydride obtained according to Example 8, 300 parts of ethylene-glycol-monomethyl ether and 9 parts of ethanol amine were refluxed to the boil for 6 hours. When the reaction was complete, the dyestuff was filtered with suction in cold condition, washed with methanol and dried. This dyestuff yielded brilliant yellow dyeings on polyester materials, of excellent fastness to light and thermofixation.

In the following table, there are indicated further dyestuffs and their tints on polyethylene terephthalate, which were obtained according to the embodiments described in the above-mentioned examples:

| | Dyestuff | Tint |
| --- | --- | --- |
| 1 | N–(CH$_2$)$_3$–O–CH(CH$_3$)$_2$ | Greenish yellow. |
| 2 | N–(CH$_2$)$_3$–O–(CH$_2$)$_3$–CH$_3$ | Do. |
| 3 | N–(CH$_2$)$_3$–OH | Do. |
| 4 | N–C$_6$H$_4$–OCH$_3$ | Do. |

| | Dyestuff | Tint |
|---|---|---|
| 5 | 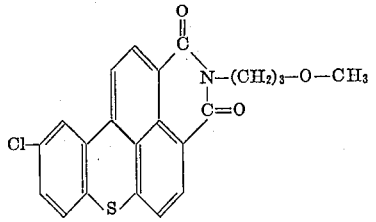 | Yellow. |
| 6 | 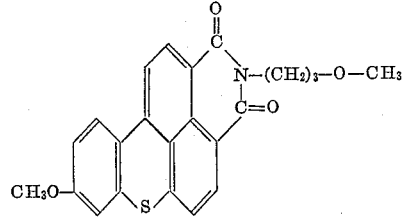 | Do. |
| 7 | 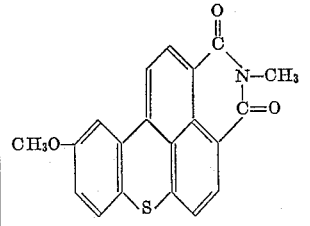 | Do. |
| 8 | 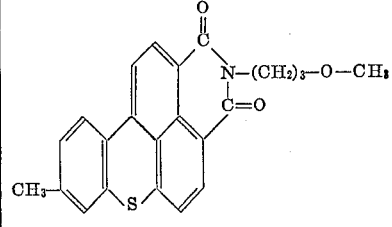 | Greenish yellow. |
| 9 | 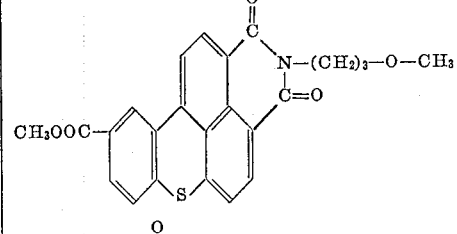 | Yellow. |
| 10 | 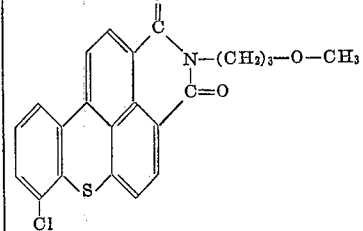 | Do. |
| 11 | 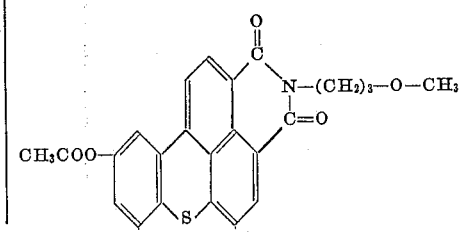 | Do. |

| | Dyestuff | Tint |
|---|---|---|
| 12 | [structure: thioxanthene-fused naphthalimide with N–H] | Do. |
| 13 | [structure: thioxanthene-fused naphthalimide with N–NH₂] | Do. |
| 14 | [structure: thioxanthene-fused naphthalimide with N-phenyl] | Do. |
| 15 | [structure: dimethyl-substituted thioxanthene-fused naphthalimide with N–(CH₂)₃–O–CH₃] | Do. |
| 16 | [structure: Cl, CH₃-substituted thioxanthene-fused naphthalimide with N–CH₂–CH₂–OH] | Do. |
| 17 | [structure: dichloro-substituted thioxanthene-fused naphthalimide with N–(CH₂)₃–O–CH₃] | Do. |
| 18 | [structure: thioxanthene-fused naphthalimide with N–OH] | Do. |

| Dyestuff | Tint |
|---|---|
| 19. 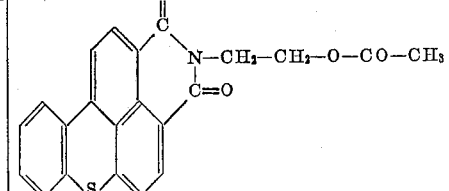 | Do. |

We claim:
1. A dyestuff of the formula

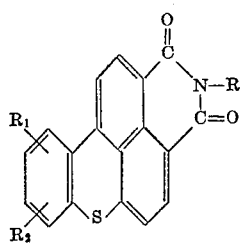

in which R represents hydrogen, alkyl, hydroxy-alkyl, alkoxy-alkyl, alkoxy-alkoxy-alkyl, cyclohexyloxy-alkyl, carboxylic, acyloxy-alkyl-, phenyl, lower alkyl-phenyl, lower alkoxy phenyl, hydroxyl or amino and $R_1$ and $R_2$ represent hydrogen, chlorine, lower alkyl, lower alkoxy, carbalkoxy or carboxylic acyloxy.

2. The compound of the formula

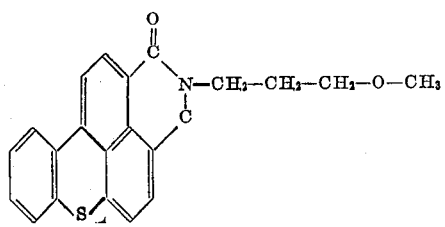

3. The compound of the formula

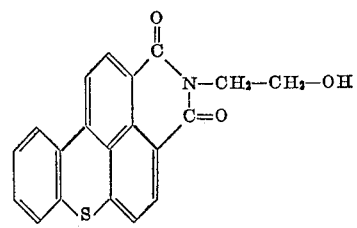

4. The compound of the formula

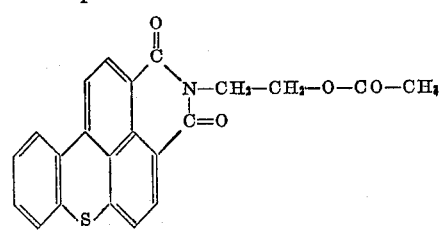

5. The compound of the formula

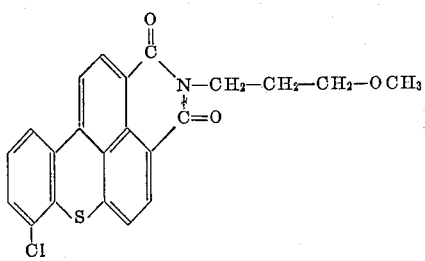

6. The compound of the formula

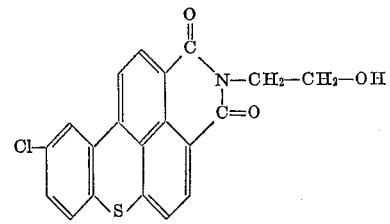

7. The compound of the formula

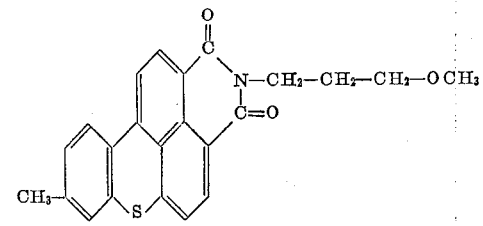

References Cited

UNITED STATES PATENTS 1,892,241  12/1932  Kranzlein et al. _____ 260—281
2,487,105  11/1949  Cornwell _____ 260—281 X

OTHER REFERENCES

Eckert, German application F15002 IVb22e, May 1956.
Surrey, Name Reactions, Academic Press 1954, pages 83, 149, 150 relied on.

ALEX MAZEL, *Primary Examiner.*

D. G. DAUS, *Assistant Examiner.*